United States Patent Office 3,320,786
Patented May 23, 1967

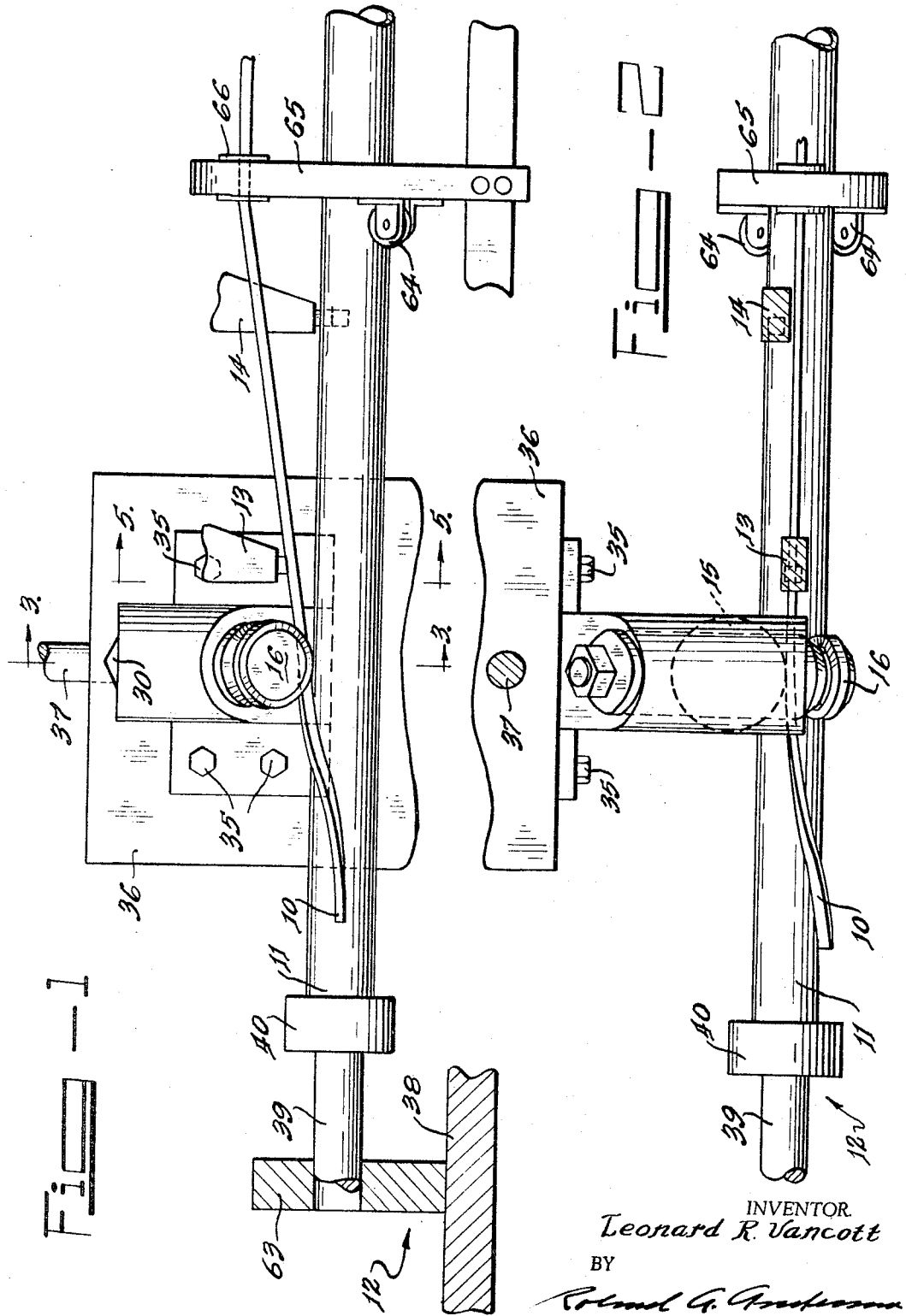

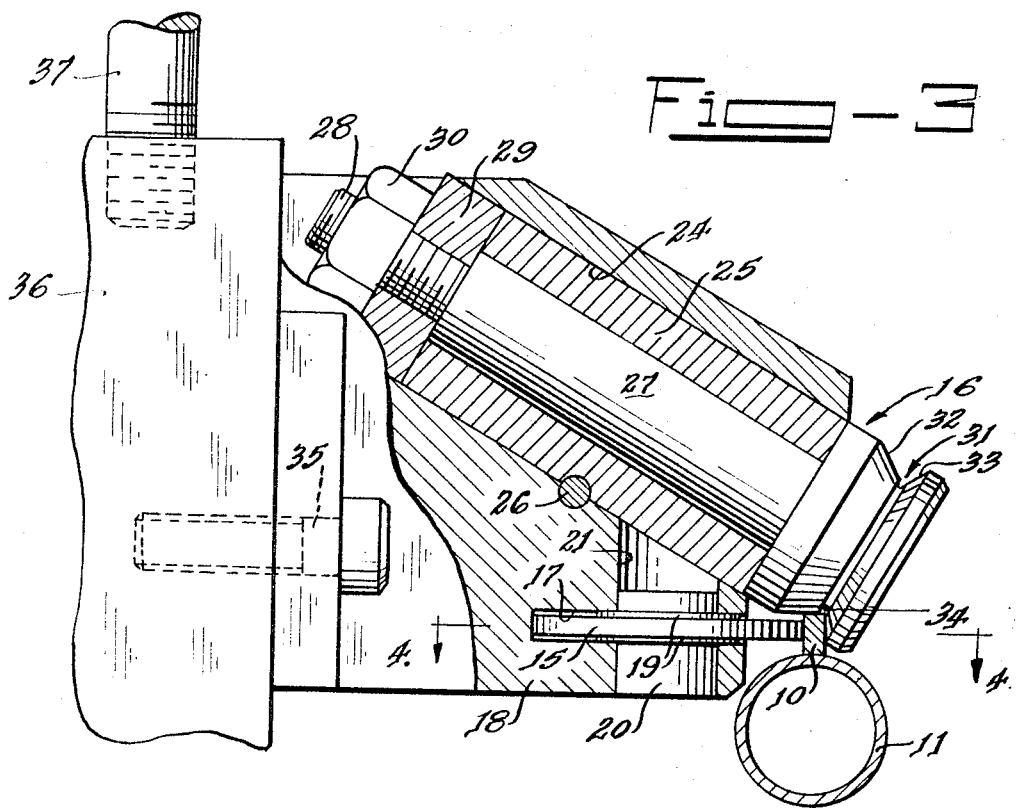
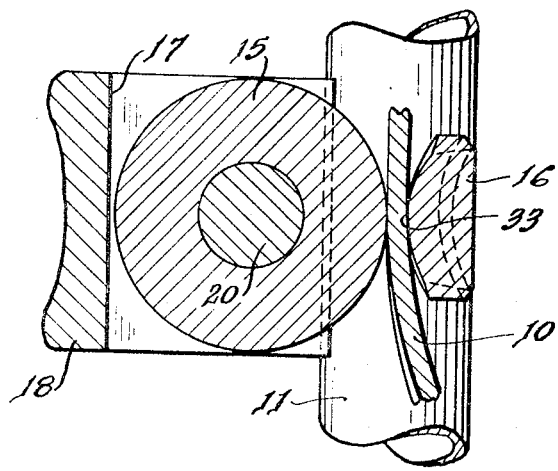
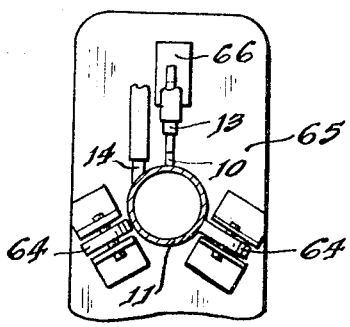
INVENTOR.
Leonard R. Vancott
BY
Attorney

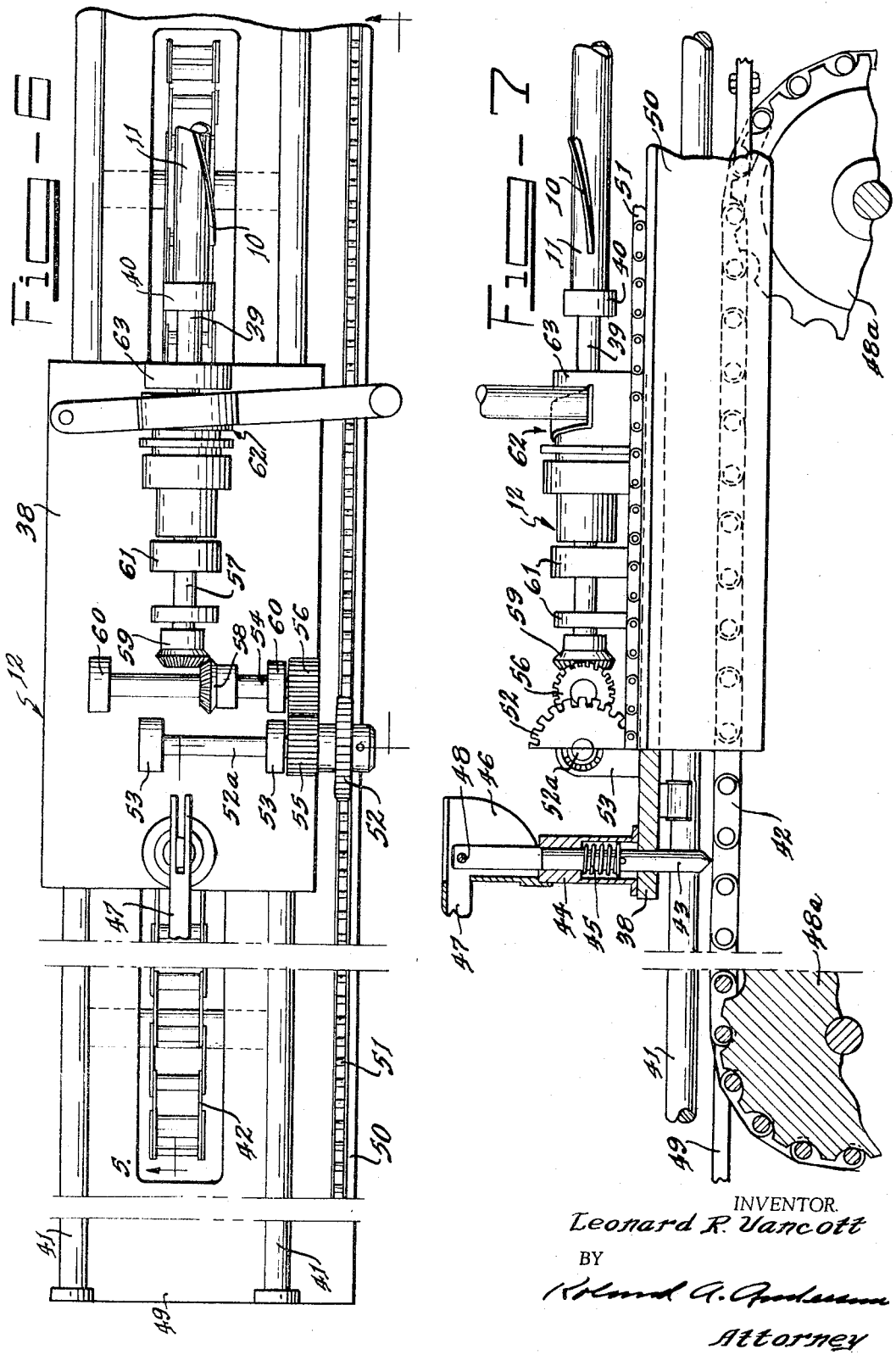

3,320,786
APPARATUS FOR WELDING A SPIRAL RIB TO A BODY
Leonard R. Vancott, San Jose, Calif., assignor to the United States of America as represented by the United States Atomic Energy Commission
Filed July 9, 1964, Ser. No. 381,602
1 Claim. (Cl. 72—95)

ABSTRACT OF THE DISCLOSURE

An apparatus for electrically welding a spiral rib to the exterior of a circular cylindrical body. The apparatus simultaneously rotates and axially shifts the body and has a short thin roll and a grooved roll that engage one side of the rib and the other side and the edge of the rib, respectively, so as to transform the rib from straight to spiral while it is being welded to the body.

Contractual origin of the invention

The invention described herein was made in the course of, or under, a contract with the United States Atomic Energy Commission.

This invention relates to an apparatus for welding a rib to a cylindrical body. More specifically, the invention relates to an apparatus for electrically welding a spiral rib to the exterior of a circular cylindrical body.

When nuclear-fuel rods are brought together in a cluster, it is highly desirable to support them one against the other in a fixed relationship. The fuel rods need to be close to one another so that the reactor of which they are a part will operate, and yet they must be spaced from one another so as to be accessible to coolant flowing over them. Spiral ribs are ideal for supporting fuel rods one against the other in spaced relation. Spiral ribs that are attached to fuel rods by being wrapped around them and possibly being welded thereto at intervals are unsatisfactory, because they tend to flutter from coolant passing over and between the fuel rods. This difficulty can be overcome by welding the ribs throughout their lengths to the fuel rods.

I have devised a novel apparatus that combines the operation of shaping a strip in spiral form and simultaneously welding it to the cylindrical circular exterior of a body such as a nuclear-fuel rod.

In the drawings:

FIG. 1 is a side view of the novel welding apparatus of the present invention;

FIG. 2 is a plan view, partly in section, of the welding apparatus;

FIG. 3 is a transverse sectional view taken on the line 3—3 and illustrating how rolls of the present apparatus are applied against the spiral rib as it is being welded to a cylindrical object;

FIG. 4 is a sectional view taken along the line 4—4 of FIG. 3;

FIG. 5 is a sectional view taken on the line 5—5 of FIG. 1 and illustrating how the cylindrical object is supported while a rib is being welded thereto;

FIG. 6 is a plan view of the part of the apparatus for rotating and axially shifting the cylindrical object while a rib is being welded thereto; and FIG. 7 is a side view, partly in section, of the apparatus of FIG. 6.

As shown in FIGS. 1, 2, and 3, a spiral rib 10 of oblong section is being welded to a circular cylindrical body 11, which may be the corrosion-resistant jacket of a nuclear-fuel element. The base of the rib, which is shorter than the sides, is welded to the body. The body 11 is pulled to the left as viewed in FIGS. 1 and 2 by an apparatus 12, which simultaneously rotates the body. Welding current for attaching the rib 10 to the body 11 is supplied by electrodes 13 and 14, which engage the rib and body respectively. The rib 10 is pressed against the body 11 by a thin flat roll 15 and a grooved roll 16, which engage the top and two sides of the rib. Such engagement at three surfaces of the rib is required, because it is being transformed from straight to spiral while being welded to the body 11.

As shown in FIGS. 3 and 4, the roll 15 is positioned in a horizontal slot 17 in a support body 18 so as to protrude therefrom and has a hub portion 19 which is of greater axial length than the balance of the roll 15 and fits the slot 17. The roll 15 is journaled on a pin 20 retained in the slot 17. The pin 20, which is of relatively large diameter is force-fitted in a short vertical bore 21 in the body 18, which bore extends at right angles to the slot 17.

The body 18 has a relatively long sloping bore 24 for accommodating the grooved roll 16. The bore 24 is located above the slot 17 and extends with respect thereto at an angle appreciably less than 90°, for example, at 30°. The upper end of the bore 21 communicates with the bore 24. A long bushing 25, is held in the bore 24 by a dowel pin 26 against rotation and axial movement with respect to the support body 18. A long shaft 27 is journaled in the bushing 25 and has one end secured to the grooved roll 16. The other end of the shaft 27 has a reduced threaded portion 28 mounting a thrust washer 29 and having threaded engagement with a nut 30. The nut and thrust washer act against the upper end of the bushing 25 and keep the grooved roll 16 against the lower end of the bushing.

The roll 16 has a 90° groove 31 formed of conical surfaces 32 and 33. The surface 32, which engages the top of the rib is at 30° to the axis of the shaft 27. The surface 33, which engages one side of the rib 10, is at 60° to the axis of the shaft 27. The roll 16 is relieved at the corner that would be formed by the meeting of surfaces 32 and 33, so that an arcuate recess 34 is formed to clear the rib 10 at the junction of its top with its side engaged by the roll surface 33. The axis of the shaft 27 of the roll 16 is at a slight angle to a plane perpendicular to the axis of the body 11. Thus with reference to FIG. 3, the axis of shaft 27 is not in the plane of the paper, but is increasingly forward or upward of the plane of the paper when considered in a direction from roll 16 toward the thrust washer 29. This angling of the axis of shaft 27 makes the rolls grip the rib 10 at such an angle during welding to the body 11, that the portion of the rib 10 welded to the body 11 spirals in the direction indicated in FIGS. 1 and 2.

As shown in FIGS. 1, 2, and 3, the support body 18 is secured by screws 35 to a block 36. The rib 10 is held down on the body 11 by a downward force supplied by pneumatic means (not shown) against a rod 37 having its lower end in threaded engagement with the top of the block 36.

By way of example, the rib 10 and the jacket of the body 11 are of a zirconium alloy composed of 1.5 w/o tin, 0.12 w/o iron, 0.10 w/o chromium, 0.05 w/o nickel, and the balance substantially zirconium. The rib 10 is .08" in width and .146" in height. The body 11 is .563" in outside diameter. The rolls 15 and 16 including shaft 27 are formed of tungsten tool steel such as AISI T–1. The roll 15 has an outer diameter of 1.001", an inner diameter of .377", and an axial thickness of .080" at its periphery. The roll 16 has an outer diameter of .750" and a diameter of .561" at the center of the arcuate recess 34. The surfaces 32 and 33 of the roll 16 are at 90° to one another and at 30° and 60°, respectively, to the axis of the shaft 27 of the roll 16. The shaft 27, without the threaded portion 28 thereof, has a length of 1.502″ and a diameter of .375″. The pin 20 and bushing 25 are formed of an oil-impregnated bronze. The bushing 25 has a length of 1.500″, an inside diameter of .376″, and outside diameter of .750″ and is internally chamfered at both ends. The pin 20 has a length of .375″ and a diameter of .3755″ and is chamfered at its upper end. The support body 18 is formed of mild steel. The clearance between the roll 15 and the surface 32 of roll 16 is .010″ to .015″.

The large bearing arrangement provided by the long bushing 25 and the long shaft 27 carrying the grooved roll 16 is very well suited to withstanding the pressure of about 300 lbs. applied to the rib and to carrying away the heat of welding the rib 10 to the body 11. Since the bushing 25 and shaft 27 are inclined, they are suited to carrying the grooved roll 16 which applies pressure against the top and one side of the rib 10. The bushing 25 and shaft 27 are on the same side of the rib 10 as the roll 15 and its bearing formed by the pin 20 and the slot 17. Since the bearing structure is all on one side of the rib 10, there is improved access and visibility.

Reference has already been made to apparatus 12 for pulling the body 11 during the welding operation while rotating it. As shown in FIGS. 6 and 7, this apparatus includes a carriage 38, a rotatable shaft 39, and a head 40 on the shaft fixed to the forward end of the body 11. The carriage 38 is mounted for movement along a pair of rails 41. The carriage is moved by a sprocket chain 42 with which it is connected at will by a retractable pin 43. The pin 43 is slidably mounted in a bearing 44 on the carriage 38 and is controlled by a spring 45, a cam 46, and an arm 47. The spring 45 acts between the bearing 44 and the pin 43 to urge the pin down into the sprocket chain 42, whereby the carriage 38 is connected to move with the sprocket chain. The pin 43 is retracted from the sprocket chain 42 to the position of FIG. 7 against the spring 45 by rotation of the arm 47 about its pivot 48 on the pin. The cam 46, being fixed to the arm 47, also rotates, and, in so doing, lifts the pivot 48 on the pin 43, since the cam rides on the top of the bearing 44 and has its maximum width in the position of FIG. 7. The chain 42 extends in a loop about two sprockets 48a, one of which is driven.

The rails 41 are carried on a platform 49 having a shelf 50, on which is mounted a fixed sprocket chain 51. A sprocket 52 meshes with the chain 51 and is secured to a countershaft 52a journaled in bearings 53 on the carriage 38. The countershaft 52a is drivingly connected with a cross shaft 54 by meshing spur gears 55 and 56 fixed to the shafts 52a and 54, respectively. The cross shaft 54 is drivingly connected with a longitudinal shaft by meshing level gears 58 and 59 fixed to the shafts 54 and 57, respectively. The shaft 54 is supported in bearings 60 on the carriage 38. The shaft 57 is supported on bearings 61 on the carriage 38. A clutch 62 connects the shafts 57 and 39. A bearing 63 supports the shaft 39 on the carriage 38.

It will be seen that when the carriage 38, driven by the sprocket chain 42, moves along the platform 49, the sprocket 52, meshing with the stationary chain 51 and moving with the carriage 38, rotates. Rotation of the sprocket 52 is transmitted to the head 40 and the body 11 through shaft 52a, gears 55 and 56, shaft 54, gears 58 and 59, shaft 57, clutch 62, and shaft 39. Thus, as the body 11 is pulled along longitudinally by the carriage 38, the body also rotates. Because the body 11 rotates while moving longitudinally, the rib 10 acquires a spiral shape as it is welded to the body.

As shown in FIGS. 1 and 2, the body 11 is supported on two rolls 64 carried by an upright 65. The upright also carries a guide 66 through which the rib 10 passes on its way to the rolls 15 and 16. The guide 66 keeps rib 10 spaced from the body 11 until the rib reaches the rolls 15 and 16. The welding electrodes 13 and 14 are located between the guide 66 and the rolls 15 and 16. The welding current is 500 to 900 amperes, 80 to 100 volts at open circuit, and 450 kc. per second. The high frequency of the welding current localizes the heating in the rib 10 and body 11 essentially to the facing surfaces thereof, so that the rib 10 remains stiff enough to be effectively handled by the rolls 15 and 16 of the present apparatus.

It is understood that the invention is not to be limited by the details given herein but that it may be modified within the scope of the appended claim.

The embodiments of the invention in which an exclusive property or privilege is claimed are defined as follows:

Apparatus for wrapping a rib about a circular cylindrical object and welding the base of the rib to the object, said apparatus comprising means for rotating the object about its axis while shifting it therealong, a support body having a narrow flat slot, a short bore intersecting the slot perpendicularly thereto, and a long bore extending at an angle appreciably less than 90° with respect to the slot, a short thin roll fitting the slot and protruding from the body so as to be engageable with one side of the rib, a short pin located in the short bore and extending through the thin roll so as to retain it in the slot and provide it with an axis of rotation, a long bushing positioned in the long bore and fixed against rotation and axial movement with respect to the body, a long shaft journaled in the bushing, a grooved roll fixed to one end of the shaft and being engageable with the top of the rib and with the side of the rib opposite that engageable with the thin roll, the thrust of the rib against the grooved roll being transmitted by the latter against the adjacent end of the bushing and by the shaft against the interior of the bushing, a thrust washer mounted on the shaft and acting against the end of the bushing remote from the grooved roll, and a nut threaded to the end of the shaft remote from the grooved roll and tightened against the thrust washer to keep the grooved roll in contact with the bushing.

References Cited by the Examiner

UNITED STATES PATENTS

| | | | |
|---|---|---|---|
| 1,472,719 | 10/1923 | Horvath | 113—1 |
| 1,840,317 | 1/1932 | Horvath | 113—1 |
| 1,896,350 | 2/1933 | Bundy | 113—1 |
| 2,372,795 | 4/1945 | Rodeck | 72—136 |
| 2,437,500 | 3/1948 | Bruegger | 72—136 |
| 2,667,852 | 2/1954 | Brown | 113—1 |
| 2,792,050 | 5/1957 | Edwards | 29—202 |
| 2,812,794 | 11/1957 | Chapman | 72—136 |

CHARLES W. LANHAM, *Primary Examiner.*

E. M. COMBS, *Assistant Examiner.*